United States Patent [19]

Hendren

[11] 4,430,718

[45] Feb. 7, 1984

[54] IMPLEMENTATION SYSTEM

[76] Inventor: Philip A. Hendren, 2105 Scenic Dr., Austin, Tex. 78703

[21] Appl. No.: 239,463

[22] Filed: Mar. 2, 1981

[51] Int. Cl.³ .......................... G06F 15/46; B26D 1/10
[52] U.S. Cl. ........................................ 364/475; 83/71; 83/171; 83/651.1; 219/69 V; 219/69 W; 364/191
[58] Field of Search ................ 364/188, 189, 190–193, 364/474, 475, 512, 520; 219/68, 69 R, 69 V, 69 W; 83/71, 651.1, 747, 171; 318/39, 571, 568; 51/165.71, 165.72

[56] References Cited

U.S. PATENT DOCUMENTS

| | | | |
|---|---|---|---|
| 2,866,506 | 12/1958 | Hierath et al. | 164/115 |
| 3,117,211 | 1/1964 | Tansey | 219/69 W |
| 3,540,336 | 11/1970 | Kelsey | 83/171 |
| 3,593,615 | 7/1971 | Shelton | 83/171 X |
| 3,610,081 | 10/1971 | Gerber | 83/171 X |
| 3,757,617 | 9/1973 | Fabbri | 83/171 X |
| 3,780,607 | 12/1973 | Gerber | 83/71 X |
| 3,788,178 | 1/1974 | Pantel | 83/171 |
| 3,805,650 | 4/1974 | Pearl | 83/71 X |
| 3,848,490 | 11/1974 | Arel | 83/71 X |
| 3,895,358 | 7/1975 | Pearl | 83/71 X |
| 3,932,923 | 1/1976 | DiMatteo | 29/407 |
| 3,968,711 | 7/1976 | Wilson | 83/171 |
| 4,018,117 | 4/1977 | Patterson | 83/171 X |
| 4,077,301 | 3/1978 | Brahm | 83/171 X |
| 4,133,233 | 1/1979 | Pearl | 83/71 X |
| 4,171,657 | 10/1979 | Halberschmidt et al. | 83/71 X |
| 4,301,349 | 11/1981 | Inoue | 219/69 W |

OTHER PUBLICATIONS

Staley et al.–"Computer–Aided Design of Curved Surfaces with Automatic Model Generation"–ASME Design Engineering Conf. & Show, Chicago, Ill.–Feb. 8, 1980, pp. 1–9.

Haworth et al.–"Development of Microprocessor Control of a Model-Making Machine"–Computers and Digital Techniques–Aug. 1978, pp. 75–78.

*Primary Examiner*—Joseph F. Ruggiero
*Attorney, Agent, or Firm*—David S. Wise; Russell D. Weaver

[57] ABSTRACT

A system for converting design information into three-dimensional shapes includes a design information storing and processing apparatus, a controller for converting digital into electrical signals, and a cutter for sculpturing a workpiece into a three-dimensional form. The system enables a designer to sketch a proposed design on the storing and processing apparatus and immediately view the design on a three-dimensional model.

13 Claims, 7 Drawing Figures

IMPLEMENTATION SYSTEM

BACKGROUND OF THE INVENTION

The present invention relates generally to automated design systems for converting design information into three-dimensional models and more particularly to apparatus controllable by a digital computer for sculpturing materials of low modulus of elasticity into desired shapes using a hot-wire.

The design and manufacture of shaped objects ordinarily involves a multistep procedure. First, the designer sketches a desired shape on paper. When the designer determines that the shape may have the desired appeal, a more formal drawing is made, either by the designer or by a draftsman. If, after such formal drawings are made, the designer continues to feel the designed shape has the desired appeal, a model of the shaped product is manufactured. In many cases, the model is carved from some soft material. Alternatively, the model may be cast from a mold manufactured in accordance with the design. If the model is satisfactory, a system is set up for manufacturing a product with the desired design. This last step often involves the manufacture of patterns and/or final molds. In some cases, such last step involves programming automated machinery to cut the shape out of a particular workpiece.

At any step prior to final acceptance of the shape as embodied in the manufactured product, it may be determined by the designer or someone else that the design does not have the desired appeal. At such time, the designer will go back in the process, often to the sketching step, and make alterations. This process continues until the manufacturing process produces a product of the desired shape.

This process, obviously, can take a great deal of time and often costs a lot of money. Because simple products are often low-profit items, this initial design cost is substantial compared to the cost of the product. As a result, the cost of design must be spread over a large number of product sales.

Therefore, it is desirable to have a system for design and manufacture of relatively simple, low-cost products that will substantially reduce the time and expense involved in the design and manufacture process.

SUMMARY OF THE INVENTION

The present invention is a system that permits automatic conversion of design information, including rough drawings, into a shaped product, allows for rapid change in design information, and permits retention of design information for mass-manufacture of the product in accordance with the desired design. Such product can be shaped by the system from a workpiece having a low modulus of elasticity.

The present invention includes a design information storing and processing apparatus, having a processor output, for (i) converting information into digital information, (ii) storing such digital information, and (iii) making such digital information available at the processor output; a controller, having a controller input and a controller output, for converting digital information received at the controller input from the processor output into electrical signals that can be used to drive electrical-to-mechanical transducers, such electrical signals being provided at the controller output and having characteristics that are a function of the digital information provided at the controller input; and a cutter, having a cutter input connected to the controller output, for sculpturing a workpiece made of a material into a three-dimensional form in response to the electrical signals provided at the cutter input.

BRIEF DESCRIPTION OF THE DRAWINGS

For a detailed description of the preferred embodiments of the invention, reference will now be made to the accompanying drawings wherein.

DETAILED DESCRIPTION OF THE PREFERRED EMBODIMENT

1. The System

Figure 1:
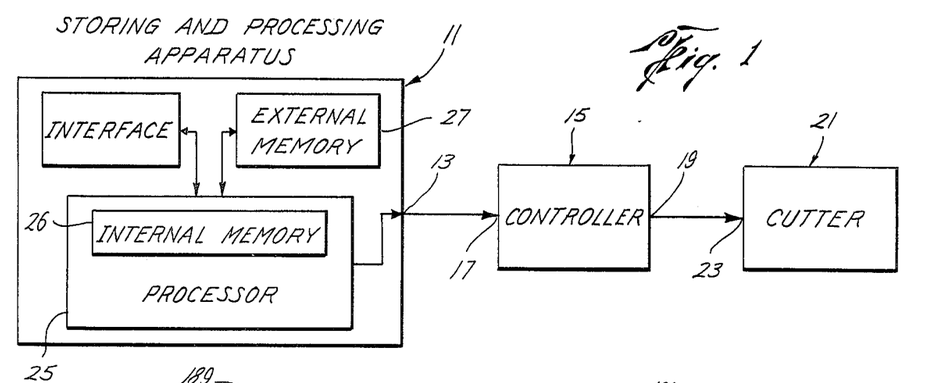
FIG. 1 is a block diagram of the preferred embodiment of the design implementation system.

Referring to FIG. 1, the preferred embodiment of the present invention includes design information storing and processing apparatus 11, having a processor output 13, for converting design information provided by an operator/designer into digital information, storing such digital information and making such digital information available at processor output 13; controller 15, having a controller input 17 and a controller output 19, for converting digital information received at controller input 17 from processor output 13 into electrical signals that can be used to drive electrical-to-mechanical transducers, such as electric motors, such signals being provided at controller output 19 and having characteristics that are a function of the information provided at controller input 17; and cutter 21, having a cutter input 23 connected to controller output 19, for cutting or sculpturing a workpiece made of a material of low modulus of elasticity, such as polyurethane, polystyrene, ethafoam, wax or balsa, into a three-dimensional form in accordance with the electrical signals provided by controller output 19.

Preferably, the relationship of the basic components of the invention, i.e., apparatus 11, controller 15 and cutter 21, should be such that (i) as an operator/designer drafts a design for a three-dimensional form using apparatus 11, information relating to such design is stored by apparatus 11 as digital data, (ii) when the operator/designer has completed the design to the point that he wishes to cut a three-dimensional embodiment of the design, he can command apparatus 11 to feed the digital data related to such design to input 17 of controller 15, (iii) as digital data is supplied to input 17 of controller 15, controller 15 simultaneously converts such data into electrical signals that cause cutter 21 to cut from a workpiece a form that embodies the design drafted by the operator/designer. Thus, the operator/designer will have a three-dimensional embodiment of the drafted design almost immediately after the design is drafted. In this way, the operator/designer can evaluate the physical appearance of the design. If upon such evaluation, the operator/designer feels that certain modifications in the design might improve the appearance of the design in view of the use to which the design is to be put, the operator/designer can make such modifications to the design using apparatus 11 so as to modify the digital data stored in apparatus 11 and command apparatus 11 to feed the modified data to input 17 of controller 15 so that cutter 21 will cut a new three-dimensional form incorporating the design modifications.

Once the operator/designer has a design that meets his criteria and whose physical embodiment has the desired physical appearance, the operator/designer can produce as many embodiments of this final design as desired simply by repeating the command to apparatus 11 to supply the digital data defining such a design to input 17 of controller 15 or by programming apparatus 11 automatically to repeat such a command. Thus, the system of the invention is capable not only of aiding in the design of three-dimensional forms, but also of mass manufacturing such forms.

2. The Design Information Storing and Processing Apparatus

As shown in FIG. 1, apparatus 11 preferably includes processor 25, having internal memory 26, for receiving data, manipulating such data and supplying the results of a program stored in such internal memory 26; external memory 27, which may include off-line magnetic tape units or disk-drive units, by means of which blocks of data relating to a particular design can be stored for future use; and operator/designer interface 29 by means of which the operator/designer can (i) deliver control commands to processor 25, (ii) input data, including design-related data, to processor 25 and (iii) monitor information and data stored and/or being transferred to either or both external memory 27 or internal memory 26. External memory 27, interface 29, and processor output 13 are connected to processor 25 by appropriate data busses.

A design control program is stored in internal memory 26 and/or external memory 27 such that (i) the design-related data input by the operator/designer through interface 29 will be stored in external memory 27, (ii) the operator/designer can deliver a command, hereinafter sometimes referred to as the "cut command," that will cause processor 25 to output at processor output 13 digital data whose characteristics depend on the stored design-related data, and (iii) the operator/designer can make modifications to the design-related data stored in external memory 27.

It should be noted that the nature of the design-related data as well as the digital data provided at processor output 13 will depend on the characteristics, requirements and capabilities of cutter 21. In this regard, applicant has conceived two unique embodiments of cutter 21 which have been formed to provide especially desirable results as part of the system. Both of such embodiments, which are described in detail infra, include a cutting implement that moves with respect to the workpiece along a path that can be defined in terms of the x and y coordinates of a single plane. Thus, for a system using one of such embodiments of cutter 11, the design-related data should define a path in terms of the x and y coordinates of a single plane. Furthermore, in such a system, interface 29 and the design control program should be such that (i) the operator/designer can input the x and y coordinates of a desired design path into memory and/or (ii) a desired design drafted by the operator/designer can be directly translated into x and y coordinates and stored in memory.

It should further be noted that both of the embodiments of cutter 21 described infra include a hot-wire, that is a tightly stretched thin wire that becomes hot when an electrical current is passed through the wire, the temperature of the wire being proportional to the amount of current passed through it. The current necessary to cut through a particular workpiece may vary according to the characteristics of the workpiece, including the characteristics of the material of the workpiece and the physical dimensions of the workpiece. Therefore, the design control program may include either specific data for controlling the temperature or means by which temperature control data can be entered easily. Furthermore, for some workpieces, a proper cut can be obtained only if the workpiece is vibrated. Therefore, cutter 21 may include means for vibrating the hot-wire, such as, for example, a solenoid attached to the apparatus supporting the hot-wire at a location adjacent the hot-wire. By passing an on-off or ac current through the coil of the solenoid, the plunger of the solenoid can be made to move back and forth thus causing the hot-wire to vibrate. The design control program may further include data for producing and controlling the desired solenoid current.

As noted supra, it is preferred that the design control program be such that the design-related data, e.g., the x and y coordinates of a desired design path, be stored in external memory 27. In this way, once such data is stored, it can be readily retained for future use simply by removing the storage medium of such external memory, such as a disk, labelling such medium with a design identifier and filing the medium. Thus, should the operator/designer wish to manufacture forms having such a design, the particular storage medium can be withdrawn from the file and replaced in external memory 27 and then a cut command can be delivered.

Especially desirable results have been obtained by using the following components as parts of apparatus 11: (i) an Apple II microcomputer with 48K memory, a control keyboard and a CRT display, in the form of a television, all sold as a package (the "Apple II System") by Apple Computer, Inc., 10260 Bandley, Cupertino, California 95014; (ii) parallel disk operated systems (DOS) connected by data bus to the Apple II microcomputer; and (iii) an Apple "Graphics Tablet" graphic digitizer connected by data bus to the Apple II microcomputer. The control keyboard of the Apple II System functions as part of interface 29 and can be used for programming processor 25, for delivering the cut command and for inputting design-related data, such as x and y coordinates and/or modifications, into processor 25 for storage in memory. The CRT of the Apple II System also functions as part of interface 29 and provides means by which information being fed into processor 25 and information stored in internal memory 26 and/or external memory 27 can be displayed for review by the operator/designer. The remainder of the Apple II System functions as processor 25, with the 48 K memory functioning specifically as internal memory 26. The DOS function as external memory 27. By using parallel DOS, multitasking and/or multiprogramming is possible as part of interface 29 and provides means by which lines drawn on a surface, or "tablet," are immediately converted into digital information defining the paths of such lines. Because the tablet is a single plane, such digital information is readily convertible to x and y coordinates within such plane. Apple provides software packages that process such conversion as well as causes the lines drawn on the tablet to be displayed on the CRT for easy monitoring. In this way a design drafted by the operator/designer is directly translated into x and y coordinates and stored in memory while the information stored can be readily monitored for accuracy.

It should be noted that while the Apple II System has been found to provide extremely desirable results in meeting the goals of the system of the invention, numerous other entities manufacture and sell similar systems, often referred to as "personal computers," including accessories such as graphic digitizers, DOS, and related software, which could be used in the inventive system. Furthermore, it is not the intention of applicant to claim such computer systems, in themselves, as his invention or as an inventive sub-combination of the overall inventive design implementation system.

3. The Controller

As indicated supra, controller 15 converts digital information received from the processor output into electrical signals that can be used to drive electrical-to-mechanical transducers, the electrical signals being a function of the information received from the processor output. Thus, the precise configuration of controller 15 depends on both the nature of the digital information received from the processor output and the requirements of the electrical-to-mechanical transducers of cutter 21. In this regard, and as noted supra, there are two specific embodiments of cutter 21 described in this application.

In one embodiment of cutter 21, which will be referred to hereinafter as the "first cutter embodiment," the electrical-to-mechanical transducers are the motors of a modified off-the-shelf XY plotter, which is a device designed for use in conjunction with a computer, either digital or analog, to plot coordinate points in the form of a graph. Such plotters include a pen, a chart and mechanical apparatus, including two motors, for altering the position of the pen with respect to the chart, the x-position being varied in accordance to electrical signals supplied to one of the motors and the y-position being varied in accordance with electrical signals supplied to the other of such motors. Most manufacturers of such plotters also manufacture and sell adapter units which convert computer output signals into a form suitable for driving the plotter without modification to either the computer or the plotter. Thus, where cutter 21 employs a plotter, controller 15 preferably includes the adapter unit designed to be used with the plotter. As noted infra, the plotter used in the first cutter embodiment is a Houston Instruments model DP-2 plotter. Such a plotter may be connected to the Apple II microcomputer through Houston Instruments model PTC-5A-3 plotter controller (available from Houston Instruments, Austin, Texas), such controller functioning as controller 15.

In the other embodiment of cutter 21, which will be referred to hereinafter as the "second cutter embodiment," the electrical-to-mechanical transducers include stepper motors which rotate a fixed amount each time they are pulsed, the direction of rotation depending on the polarity of the pulse. One of such stepper motors controls movement in the x-direction and the other of the stepper motors controls movement in the y-direction. Preferably, where the second cutter embodiment is used as part of the system, apparatus 11 is programmed such that there are four channels at processor output 13, a first channel representing positive changes in the x-direction, a second channel representing negative changes in the x-direction, a third channel representing positive changes in the y-direction, and a fourth channel representing negative changes in the y-direction. Thus, if the desired path of the cutter is to move simultaneously in both the x- and y-directions, apparatus 11 will simultaneously output digital pulses over the first and third channels at a rate dependent on the rate of change in each direction. If apparatus 11 is so programmed, controller 15 need only include a stepper driver circuit for amplifying the power of the digital output pulses so that they can be used to drive the stepper motors in accordance with the specifications of such motors.

4. The Cutter

Generally speaking, cutter 21 includes a workpiece holder for holding the workpiece; a wire which, when electricity is passed through it, will become hot such that it can be used to cut through the workpiece, such wire hereinafter referred to as a "hot-wire"; positioning apparatus for moving the hot-wire and the workpiece relative to one another when the workpiece is held by the workpiece holder; and a power source is connected to cutter to the hot-wire. The positioning apparatus is connected to cutter input 23 and includes motorized apparatus for converting electrical signals supplied to the control signal input into mechanical motion by which the workpiece and the hot-wire are moved relative to one another. The power source preferably includes a power control device for controlling the amount of current supplied to the hot-wire so as to provide a means for controlling the temperature of the hot-wire. In the preferred embodiment of the invention, and as indicated supra, cutting apparatus 11 may have either of two alternative configurations both having several unique characteristics, one of which is referred to hereinafter as the "first cutter embodiment" and the other of which is referred to hereinafter as the "second cutter embodiment."

a. First Cutter Embodiment—Referring to FIGS. 2 and 3, the first cutter embodiment includes workpiece holder 101, hot-wire 103, positioning apparatus 105, power source 107, and support base 109.

Figure 2:
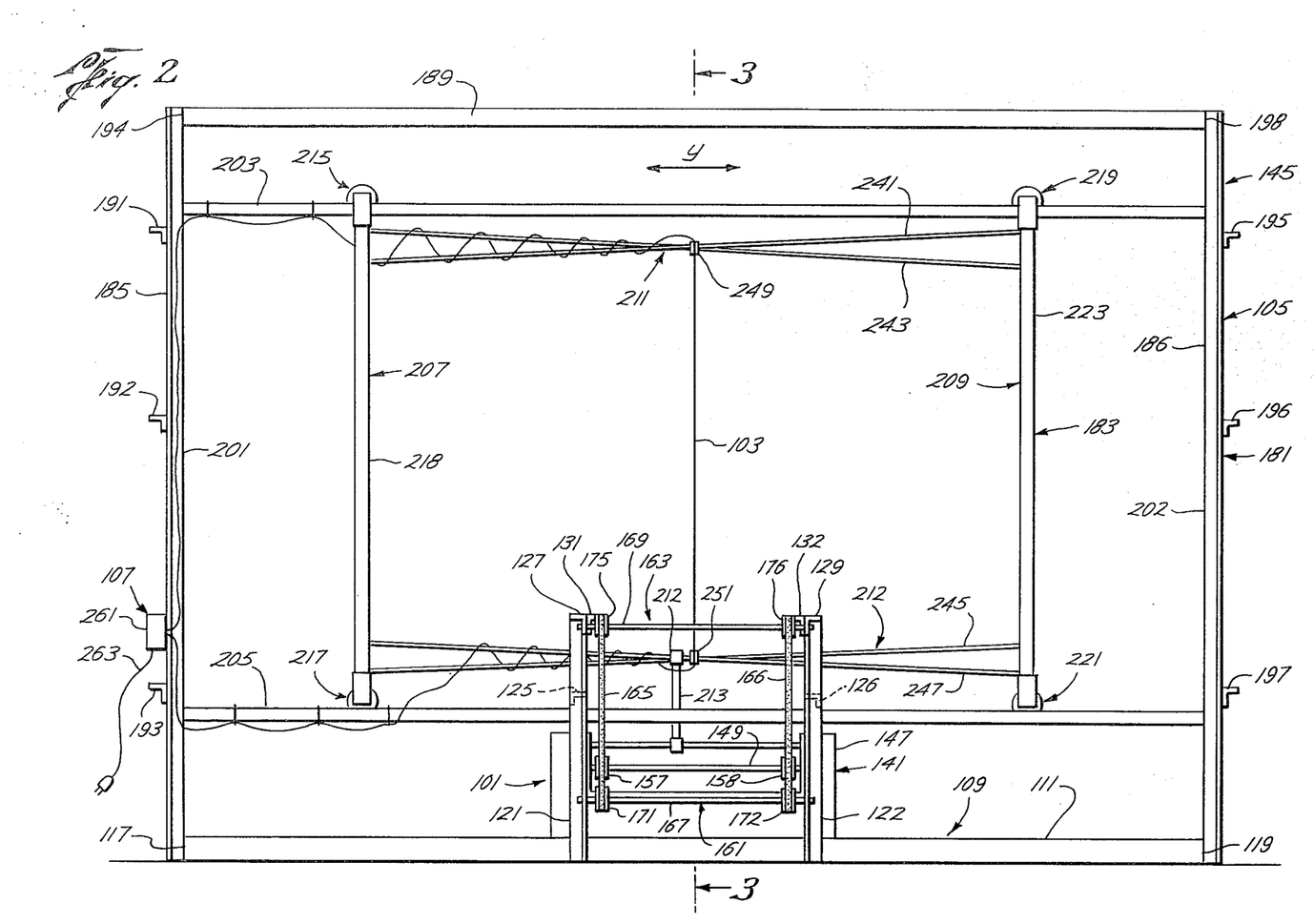
FIG. 2 is an elevation of a first embodiment of the cutter of the design implementation system.
Figure 3:
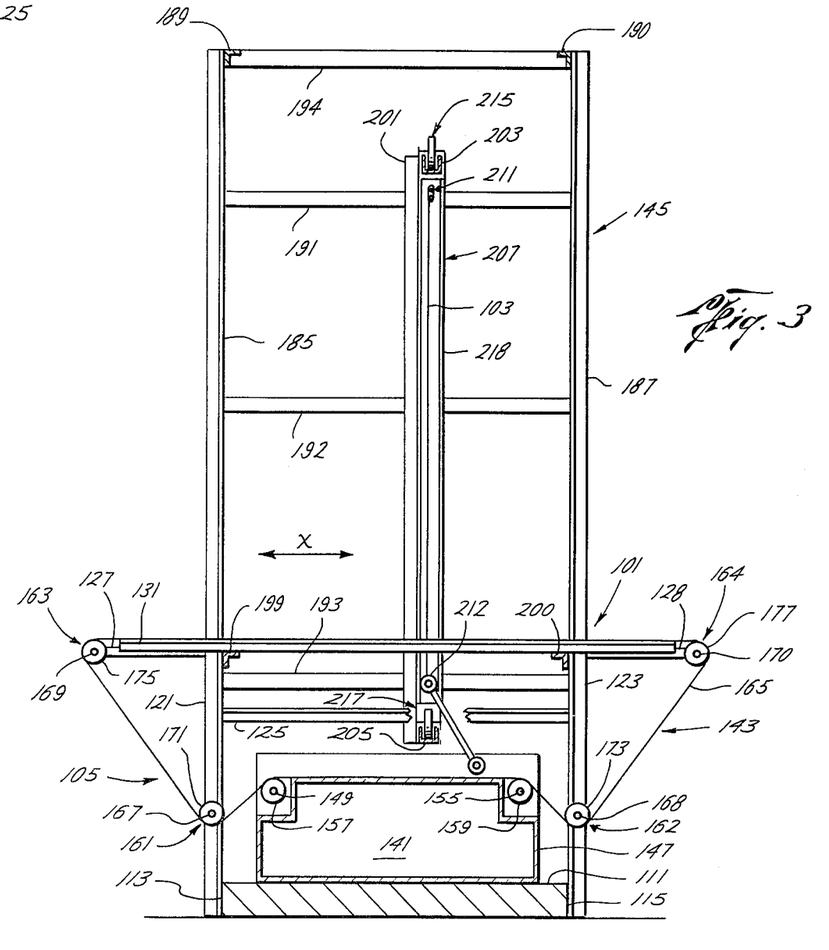
FIG. 3 is a section of the embodiment of the cutter shown in FIG. 2 taken along the line 3—3.

Support base 109 is a rigid flat piece of material 4.5 feet long and 1.75 feet wide that can be maintained in a fixed horizontal position. Support base 109 has right-rectangular, horizontal, flat upper surface 111, side surfaces 113, 115 and end surfaces 117, 119.

Workpiece holder 101 includes vertical beams 121, 122, 123, 124, horizontal support beams 125, 126, roller support beams 127, 128, 129, 130, and platform beams 131, 132. Beams 121–132 are all 1.25 inch right-angle beams made of steel.

Vertical columns 121, 122 are rigidly secured to side surface 113 of base 109, extend vertically upwardly from surface 111 a distance of 15 inches, and are spaced symetrically about the center of side surface 113 a distance of 17 inches from one another. Vertical columns 123, 124 are rigidly secured to side surface 115 of base 109, extend vertically upwardly from surface 111 a distance of 15 inches, and are spaced symetrically about the center of side surface 115 a distance of 13 inches. In accordance with this configuration of beams 121–124 with respect to base 109, the upper ends of beams 121-124 define the corners of a horizontal, right-rectangular plane (the "first-plane") 15 inches above base 109.

Horizontal support beam 125 is rigidly secured between beams 121, 123 a distance of 9 inches above surface 111. Horizontal support beam 126 is rigidly secured between beams 122, 124 a distance of 9 inches above surface 111. Platform beam 131 is 29 inches long and is rigidly secured to the upper ends of beams 121, 123 such that (i) one of the sides of beam 131 lies in a horizontal plane (the "platform plane") that is within or above the first plane and (ii) beam 131 is centered with respect to beams 121, 123. Platform beam 132 is 29 inches long and is rigidly secured to the upper ends of beams 122, 124 such that (i) one of the sides of beam 132 lies in the platform plane and (ii) beam 132 is centered with respect to beams 122, 124.

Roller support beam 127 is rigidly secured to the end of platform beam 131 adjacent beam 121 such that roller support beam 127 is horizontal and extends 2 to 4 inches from such end of platform beam 131. Roller support beam 128 is rigidly and horizontally secured to the end of platform beam 131 adjacent beam 122 such that roller support beam 128 extends 2 to 4 inches from such end of platform beam 131. Roller support beam 129 is rigidly and horizontally secured to the end of platform beam 132 adjacent beam 122 such that roller support beam 129 extends 2 to 4 inches from such end of platform beam 132. Roller support beam 130 is rigidly and horizontally secured to the end of platform beam 132 adjacent beam 124 such that roller support beam 130 extends 2 to 4 inches from such end of platform beam 132. No part of roller support beams 127-130 is above the platform plane. Varying these 4 elements allows for tensioning the drive belts.

Positioning apparatus 105 inches includes motor apparatus 141, x-position system 143 and y-position system 145.

Motor apparatus 141 is an x-y plotter that includes (i) x-signal input for receiving a first signal, (ii) x-motor for providing mechanical movement in response to the first signal, (iii) y-signal input for receiving a second signal, and (iv) y-motor for providing mechanical movement in response to the second signal. Preferably, motor apparatus 141 further includes a frame or cabinet, mechanical apparatus for converting the movement provided by the x-motor into rotational motion about an axis (the "orienting axis"), and mechanical apparatus for converting the movement provided by the y-motor to translational movement in a direction parallel to the orienting axis. The frame or cabinet of apparatus 141 should be rigidly secured to upper surface 111 of base 109 such that the orienting axis is perpendicular to the vertical plane within which platform beam 132 is disposed, whereby such orienting axis will also be perpendicular to the vertical plane within which beam 131 is disposed.

A plotter that provides the preferred features of motor apparatus 141 is available from Houston Instruments in Austin, Texas as model DP-2 plotter. The model DP-2 plotter is shown in FIGS. 2 and 3 as including cabinet 147 in which the electronics and motors of the DP-2 plotter (not shown) are housed. Rotational motion about the orienting axis is provided by shaft 149 which is connected to the x-motor, shaft 149 being part of the chart paper transport of the DP-2 plotter. Thus, proper orientation of the DB-2 plotter can be obtained by rigidly securing cabinet 147 to upper surface 111 of base 109 such that shaft 149 is perpendicular to the vertical plane within which platform beam 132 is disposed. Specifically, cabinet 147 should be centered with respect to platform beam 131, 132. Translational movement is provided in a direction parallel to shaft 149 by means of pen transport 151 of the DB-2 plotter which is mounted on and moves along pen transport shaft 153.

The DB-2 plotter further includes paper transport shaft 155 rotatably disposed in cabinet 147 opposite and parallel to shaft 149. Motor apparatus 141 further includes drive sprockets 157, 158 mounted on either end of shaft 149 and drive sprockets 159, 160 mounted on either end of shaft 155. Sprockets 157-160 each have a width of 0.5 inch, a diameter of 2 inches and have sprocket drive teeth spaced about their periphery 0.25 inch from one another.

X-position system 143 includes sprocket systems 161-164 and endless conveyor belts 165, 166. Sprocket system 161 includes shaft 167 rotatably disposed between beams 121, 122 parallel to shaft 149; sprocket system 162 includes shaft 168 rotatably disposed between beams 123, 124 parallel to shaft 149; sprocket system 163 includes shaft 169 rotatably disposed between the free ends of roller support beams 127, 129 parallel to shaft 149; and sprocket system 164 includes shaft 170 rotatably disposed between the free ends of roller support beams 128, 130 parallel to shaft 149. Sprocket system 161 further includes sprockets 171, 172 disposed on shaft 167 and aligned with platform beams 131, 132, respectively; sprocket system 162 further includes sprockets 173, 174 disposed on shaft 168 and aligned with platform beams 131, 132, respectively; sprocket system 163 further includes sprockets 175, 176 disposed on shaft 169 and aligned with platform beams 131, 132, respectively; and sprocket system 164 further includes sprockets 177, 178, disposed on shaft 170 and aligned with platform beams 131, 132, respectively. Sprockets 171-178 each have a diameter of 2, a width of 0.5 inches and sprocket teeth spaced about their periphery 0.25 inch from one another. Shafts 167, 168 are positioned 4 inches above upper surface 111 of base 109. Shafts 169, 170 are positioned 15 inches below the platform plane whereby the uppermost points of sprockets 175-178 are tangent to the platform plane. The two sprockets of each of sprocket systems 161-164 are spaced 11 inches from one another.

Each of endless belts 165, 166 has a width of 0.5 inch and has holes therethrough spaced about the entire length of such belt 0.25 inch apart such that the sprocket teeth of the various sprockets described supra can engage such holes. The outer surface of each of belts 165, 166 is covered with an abrasive material. Belts 165, 166 may be made from a high-abrasive sanding belt. Belt 165 is positioned directly over sprockets 175, 177 and platform beam 131 and is threaded under sprocket 171, over sprockets 157, 159, and under sprocket 173. Belt 166 is positioned directly over sprockets 176, 178 and platform beam 132 and is threaded under sprocket 172, over sprockets 158, 160, and under sprocket 174.

In accordance with the foregoing description, as shaft 149 is rotated by the x-motor belts 165, 166 will move in a direction parallel to platform beams 131, 132 over such beams. The abrasiveness of the outer surfaces of belts 165, 166 should be such that when a block of material, such as styrofoam, is placed over belts 165, 166 and platform beams 131, 132, such block will be carried by such belts with no slippage.

Y-position system 145 includes support frame 181 and hot-wire carriage 183.

Support frame 181 includes vertical beams 185–188, horizontal beams 189–200, vertical track support beams 201, 202, and carriage tracks 203, 205. Beams 185–202 are 1.25 inch right-angle beams made of steel. Beams 185, 186 are rigidly secured to side surface 113 of base 109 adjacent end surfaces 117, 119, respectively, and extend vertically above upper surface 111 of base 109 a distance of 48 inches. Beams 187, 188 are rigidly secured to side surface 115 of base 109 adjacent end surfaces 117, 119, respectively, and extend vertically above upper surface 111 of base 109. Horizontal beam 189 is rigidly secured between the upper ends of beams 185, 186. Horizontal beam 190 is rigidly secured between the upper ends of beams 187, 188. Horizontal beams 191–194 are rigidly secured between beams 185, 187 and are space above upper surface 111 of base 109 distances of 43.0 inches, 22.0 inches, 47.0 inches and 1.0 inches, respectively. Horizontal beams 195–198 are rigidly secured between beams 186, 188 and are spaced above upper surface 111 of base 109 distances of 43.0 inches, 22.0 inches, 47.0 inches and 1.0 inches, respecively. Horizontal beam 199 is rigidly secured between beams 185, 186 such that beam 199 extends directly beneath platform beams 131, 132. Horizontal beam 200 is rigidly secured between beams 187, 188 such that beam 200 extends directly beneath platform beams 131, 132. Vertical track support beam 201 is 48.0 inches long and is rigidly secured to the center of beams 191–193 such that the upper end of support beams 201 is 44.0 inches above upper surface 111 of base 109. Vertical track support beam 202 is 48.0 inches long and is rigidly secured to the center of beams 195–197 such that the upper end of support beam 202 is 9.0 inches above upper surface 111 of base 109. Carriage tracks 203, 205 are U-beams ⅜ inch wide and made of Aluminum. Carriage track 203 is horizontally disposed and rigidly secured between the upper ends of beams 201, 202 such that the open side of track 203 faces upwardly. Carriage track 205 is horizontally disposed and is rigidly secured between the lower ends of beams 201, 202 such that the open side of track 205 faces upwardly.

According to the foregoing description of support frame, carriage track 203 will be disposed above platform beams 131, 132 and carriage track 205 will be disposed below platform beams 131, 132. Furthermore, carriage tracks 203, 205 will be in a common vertical plane.

Hot-wire carriage 183 includes carriage supports 207, 209, hot-wire supports 211, 212 and carriage drive bar 213.

Carriage support 207 is positioned between track support beam 201 and platform beam 131 and includes wheel assemblies 215, 217, and vertical beam 218. Carriage support 209 is positioned between track support beam 202 and platform beam 132 and includes wheel assemblies 219, 221, and vertical beam 223. Each wheel assembly includes a wheel ⅜ inch wide and 1⅜ inches in diameter, a wheel shaft 1¾ inch long extending through the center of the wheel, and a pair of wheel plates, one rotatably attached to either end of the wheel shaft. Each wheel plate is 1½ inches long and ¾ inches wide and is attached to the end of a wheel shaft as indicated supra at a point at the center of such plate and ⅜ inch from the end of such plate. Wheel assemblies 215, 219 are disposed in carriage track 203 such that their plates extend downwardly. Wheel assemblies 217, 221 are disposed in carriage track 205 such that their wheel plates extend upwardly. Vertical beams 218, 223 are ¾×¾″ U-beams 35 inches long and made of aluminum. Vertical beams 218 is secured between the lower end of the wheel plates of wheel assembly 215 and the upper end of the wheel plates of wheel assembly 217 such that the open side of beam 218 faces toward track support beam 201. Vertical beam 223 is secured between the lower end of the wheel plates of wheel assembly 219 and the upper end of the wheel plates of wheel assembly 221 such that the open side of beam faces toward track support beam 203.

Hot-wire support 211 includes vertically-spaced shafts 241, 243 threaded along their entire length and rigidly secured between the upper ends of beams 218, 223. Hot-wire support 212 includes vertically-spaced shafts 245, 247 threaded along their entire length and rigidly secured between the lower ends of beams 218, 223 such that shafts 245, 247 extend under platform beams 131, 132. Hot-wire support 211 further includes ring 249 disposed around shafts 241, 243 about midway between carriage supports 207, 209 so as to pull shafts 241, 243 together at that point as shown in FIG. 2. Hot-wire support 213 further includes ring 251 disposed around shafts 245, 247 vertically beneath ring 249 so as to pull shafts 245, 247 together at that point as shown in FIG. 2. Rings 249, 251 are made of an electrical insulator. The tension caused by distortion of the shafts of the hot-wire supports and their threads should provide sufficient friction between the shafts and the rings to prevent movement of the rings with respect to the shafts.

Carriage drive bar 213 is rigidly connected between shafts 245, 247 at a point no more than 7 inches away from ring 251 and pen transport 151 of the DB-2 plotter. If a DB-2 plotter is not used, bar 213 will be secured to the mechanical apparatus providing translational movement in response to movement of the y-motor.

Hot-wire 103 is a 0.014 inch diameter nichrome wire 32 inches long and secured vertically and in tension between rings 249, 251 in such a way that hot-wire 103 is not in electrical contact with any of shafts 241, 243, 245, 247.

Power source 107 includes rheostat 261, power cord 263 for connecting rheostat 261 to an ac power supply and wires 107 for connecting the output of rheostat 261 to either end of hot-wire 103. Wires 107 should be loose enough to allow relatively free movement of hot-wire carriage 183. Rheostat 261 may either be manually adjustable by a knob or may be digitally-controllable and connected to apparatus 11 through an appropriate interface such that the current supplied by rheostat 261 may be varied in accordance with information stored in apparatus 11.

According to the operation of the first cutter embodiment, a workpiece to be cut is rested on platform beams 131, 132 such that the workpiece can be carried by belts 165, 166 as belts 165, 166 move across such platform beams as a result of rotation of the x-motor of motor apparatus 141. Preferably, and as indicated supra, there should be no movement of the workpiece relative to such belts. Thus, rotation of the x-motor will cause the workpiece to move in either polarity of a first direction, hereinafter referred to as the "x-direction," the polarity depending on the direction of rotation of the x-motor and the magnitude of movement depending on the amount of rotation of the x-motor.

Similarly, rotation of the y-motor of motor apparatus 141 will cause hot-wire 103 to move in either polarity of a direction, hereinafter referred to as the "y-direction,"

perpendicular to the x-direction, by virtue of movement of hot-wire carriage 183 through pen transport 151. The polarity and magnitude of movement of hot-wire 103 in the y-direction will depend on the direction and amount of rotation of the y-motor of motor apparatus 141.

It should be apparent from the foregoing that, relative to the workpiece, hot-wire 103 will move in the x-direction in response to rotation of the x-motor and in the y-direction in response to rotation of the y-motor. Thus, by appropriate rotation of the x- and y-motors of motor apparatus 141, which can be accomplished by providing motor apparatus with appropriate signals from controller 15 as defined by the output of apparatus 11, hot-wire 103 can be made to move relative to the workpiece in a path that can be defined in terms of x and y coordinates in a single plane.

Where the first cutter embodiment is used in the inventive system as cutter 21, the path defined by the design-related data stored in the memory of apparatus 11 preferably should be such that (i) the path begins and ends at a common point (the "start point") and (ii) movement of hot-wire 103 in the y-direction does not cause hot-wire 103 to contact either of platform beams 131, 132. (In this regard, the model DB-2 plotter, like other similar plotters, includes an interlock switch that disconnects the y-motor whenever movement of pen transport 151 moves to either extreme. This interlock switch can be readily adapted to disconnect the y-motor whenever hot-wire 103 comes within a predetermined distance of either of the platform beams.) Furthermore, in the preferred embodiment, the design control program should be such that the start point for all designs to be cut is the same. The start point may be designated as the 0.0 point in the x-y coordinate system.

An actual cutting operation is begun by selecting an appropriate workpiece. Regardless of the design to be cut, all workpiece to be cut by the first cutter embodiment must have a flat bottom having a configuration and dimensions such that the entire workpiece can be stably supported by platform beams 131, 132. In order to permit hot-wire carriage to move freely in the y-direction, it is preferred that the width of the workpiece be such that the workpiece does not extend much beyond either side of platform beams 131, 132. Because movement of hot-wire 103 in the y-direction is limited to the space between platform beams 131, 132, this latter restriction will not further limit the form that can be cut. Furthermore, the height of the workpiece should not at any point exceed the vertical distance from the platform plane to the uppermost part of hot-wire 103.

All other criteria used in selecting a workpiece will depend on the characteristics of the form to be cut. In this regard, the first cutter embodiment as described supra will only make vertical cuts and, therefore, cannot be used to cut the top of the form. Thus, it may be necessary to, sculpt the top of the form by other techniques, either before or after cutting by the first cutter embodiment. The cross-sectional configuration of the workpiece, i.e., the section transverse to the height, should be such that the cross-section of the final form is fully encompassed by the cross-section of the workpiece.

The workpiece thus selected is placed on platform beams 131, 132 as described supra. The workpiece should be oriented with respect to the start point, at which hot-wire 103 should be positioned prior to cutting, such that as hot-wire 103 moves with respect to the workpiece along the path defined by the design-related data stored in the memory of apparatus 11, hot-wire 103 will cut through the workpiece. Such orientation can be determined by the operator/designer on the basis of prior cutting runs and/or on the basis of the knowledge of the operator/designer of the path to be cut with respect to the starting point.

Once the workpiece is properly oriented, rheostat 261 is adjusted until hot-wire 103 is hot enough to pass through the workpiece without substantial resistance and without any tendency to move the workpiece with respect to belts 165, 166. The actual current required to reach such temperature will depend on the material from which the workpiece is made.

After the desired hot-wire 103 temperature is established, a cut command is delivered through apparatus 11 and the x- and y-motors will rotate in accordance with the data provided at processor output 13 and as converted by controller 15. This will cause hot-wire 103 to move along a path with respect to the workpiece whereby hot-wire 103 will cut through such workpiece. When all the data defining the path for a particular design has been provided at processor output 13, at which time hot-wire 103 should be at the starting point, the workpiece is removed from platform beams 131, 132. The material cut away from the workpiece can then be removed leaving a three-dimensional form corresponding to the design-related data stored in the memory of apparatus 11.

b. Second Cutter Embodiment—Referring to FIGS. 4 and 5, the second cutter embodiment includes workpiece holder 501, hot-wire apparatus 503, positioning apparatus 505, power source 507 and support base 509.

Figure 4:
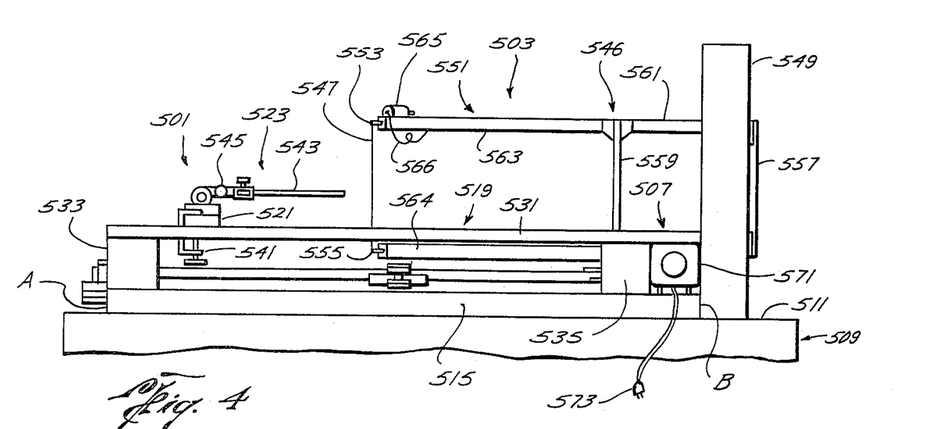
FIG. 4 is an elevation of a second embodiment of the cutter of the design implementation system.
Figure 5:
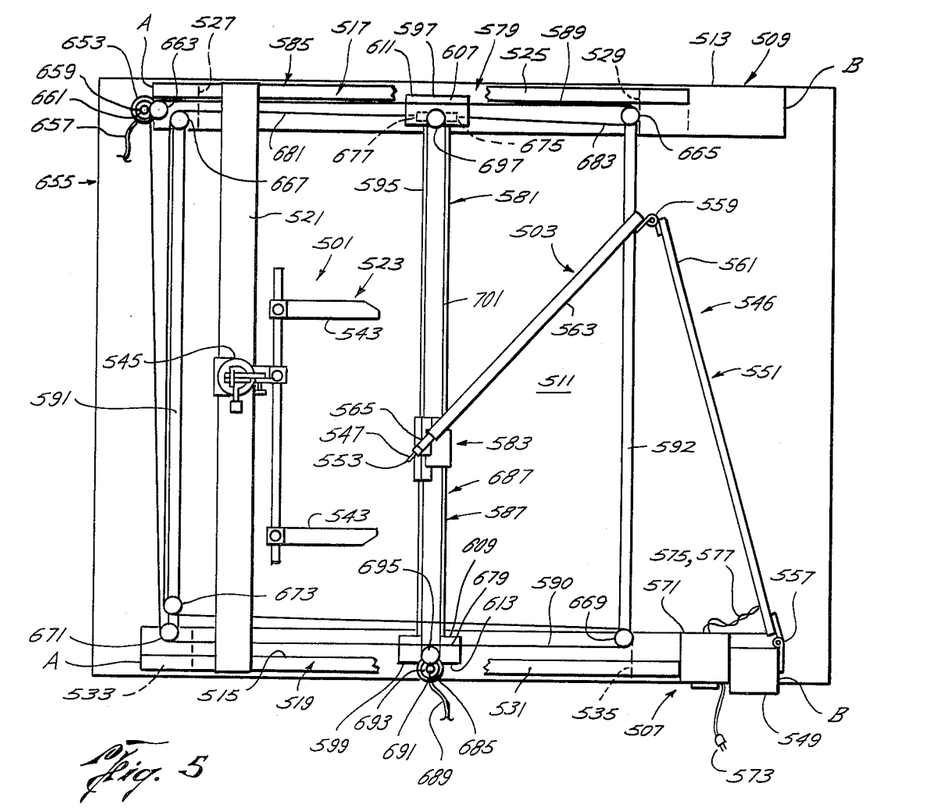
FIG. 5 is a plan view of the embodiment of the cutter shown in FIG. 4.

Support base 509 includes a rigid piece of material with flat, horizontal upper surface 511 and rigid frame supports 513, 515 secured to upper surface 511. Frame supports 513, 515 each have a horizontal, flat upper surface, a length of 38 inches, a height of 1⅜ inches and a width of 3⅜ inches and are positioned parallel to one another such that their axes are 32 inches apart. Each of frame supports 513, 515 has an end A and an end B.

Workpiece holder 501 includes side supports 517, 519, cross supports 521 and clamp 523. Side support 517 includes elongate horizontal support 525 that is 38 inches long and vertical supports 527, 529 at either end of horizontal support 525 and rigidly supporting horizontal support 525 above frame support 513 such that (i) the upper surface of horizontal support 525 is ¾ inches above the upper surface of frame support 513, (ii) horizontal support 525 is parallel to frame support 513 and (iii) one end of horizontal support 525 is substantially flush with end A of frame support 513. Side support 519 includes elongate horizontal support 531 that is 38 inches long and vertical supports 533, 535 at either end of horizontal support 531 and rigidly supporting horizontal support 531 frame support 515 such that (i) the upper surface of horizontal support 531 is ¾ inches above the upper surface of frame support 515, (ii) horizontal support 531 is parallel to frame support 515, and (iii) one end of horizontal support 531 is substantially flush with end A of frame support 515. Cross support 521 is 30 inch and is rigidly secured between the flat upper surfaces of horizontal supports 525, 531. The strength of side supports 517, 519 and 521 should be such that the center of cross support 521 is relatively rigid with respect to support base 509.

Clamp 523 is secured to the center of cross support 521 and may be any of a variety of devices that can releasably secure a workpiece in a fixed position relative to cross support 521. Preferably, clamp 523 is adjustable so that the position of a workpiece secured thereby can be varied in any direction without releasing the workpiece. A preferred device for use as clamp 523 is sold under the name "panavise" by Panavise Products, Inc., Long Beach, Calif. Such a device is shown in FIGS. 3 and 4 and includes mounting clamp 514 by means of which the device is releasably secured to cross support 521; clamp jaw apparatus 543 by means of which a workpiece is releasably secured; and camp adjust apparatus 545 by means of which the position of a workpiece secured by jaw apparatus 543 can be varied.

Hot-wire apparatus 503 includes hot-wire support device 546 and hot-wire 547.

Hot-wire support device 546 includes support post 549, support arm 551, and support tips 553, 555. Support post 549 is rigidly secured to frame support 555 adjacent end B of such frame support and extends vertically above the upper surface of frame support 555 a distance of 18.0 inches. Support arm includes hinges 557, 559 and arm beams 561–564. Each of arm beams 561–564 is a U-bracket 25.0 inches long and made of aluminum. Arm beams 561, 562 are mounted to support post 549 by means of hinge 557 such that (i) they extend horizontally therefrom, (ii) they can move through substantially all of the 180° arc on the side of frame support 555 facing toward frame support 555, (iii) arm beam 561 is 9.0 inches above the upper surface of frame support 555, and (iv) arm beam 564 is 8 inches below arm beam 561. Arm beams 563, 564 are connected to the free ends of arm beams 561, 562 by hinge 559 such that (i) they extend horizontally therefrom with arm beam 563 aligned with arm beam 561 and arm beam 564 aligned with arm beam 562 and (ii) they can sweep through substantially all of a 180° arc in the direction indicated by arrow C in FIG. 5 beginning with point D. Support tips 553, 555 are electrical insulators rigidly secured to and extending horizontally from the ends of arm beams 563, 564, respectively.

Hot-wire 547 is made of 0.014 inch diameter nichrome wire and is secured in tension between support tips 553, 555 such that hot-wire 547 is vertical and is not in electrical contact with any part of arm beams 561–564.

Hot-wire apparatus 503 may further include solenoid 565 which may be connected by wires 566 to a source of on-off or a-c current. Such a current may be produced by apparatus 11 by connecting solenoid 566 to apparatus 11 through appropriate interfacing and storing appropriate control information in apparatus 11. Solenoid 566 is secured to arm beam 563 adjacent hot-wire 547 such that the movement of the plunger of solenoid 565 will cause hot-wire 547 to vibrate.

Power source 507 includes rheostat 571, power cord 573 for connecting rheostat 571 to an ac power supply and wires 575, 577 extending from rheostat 571 along support arm 551 and electrically connected to either end of hot-wire 547 adjacent support tips 553, 555 such that when power cord 573 is connected to an ac power supply, ac electrical current is passed through hot-wire 547 in an amount dependent on the setting of rheostat 571 whereby the temperature of hot-wire 547 can be varied by adjusting rheostat 571.

Positioning apparatus 505 includes track assembly 579, slide bar apparatus 581, slide unit 583, x-movement assembly 585 and y-movement assmebly 587.

Track assembly 579 includes track beams 589–592, each being a U-beam made of aluminum, arranged in a right rectangle such that (i) the open side of each beam faces to the outside of such rectangle, (ii) beams 589, 590 rest on and are parallel to the axes of frame supports 513, 515, respectively, and (iii) beam 591 extends between frame supports 513, 515. For the purposes of the remainder of this description of the second cutter embodiment, the "x-direction" will be defined as that in which beams 589, 590 extend and the "y-direction" will be defined as that perpendicular to the x-direction.

Slide bar apparatus 581 extends between and perpendicular to track beams 589, 590 and is slidably mounted thereon such that slide bar 581 moves easily in either polarity of the x-direction. Slide bar apparatus includes center bar 595, end guides 597, 599 and rollers 601–604. Center bar 595 is 32.0 inches long, 2.0 inches wide and ½ inches thick. End guides 597, 599 have flat upper plates 607, 609, respectively, that are rigidly secured to either end of center bar 595 such that they are spaced slightly above and extend over the upper surface of track beams 589, 590, respectively, and extend 2.0 inches beyond the outside edges of such beams. End guides 597, 599 further include side surfaces 611, 613, respectively, extending vertically downwardly from their flat upper plates 607, 609, respectively, such that they are spaced from and extend parallel to the open sides of track beams 589, 590, respectively.

Figure 6:
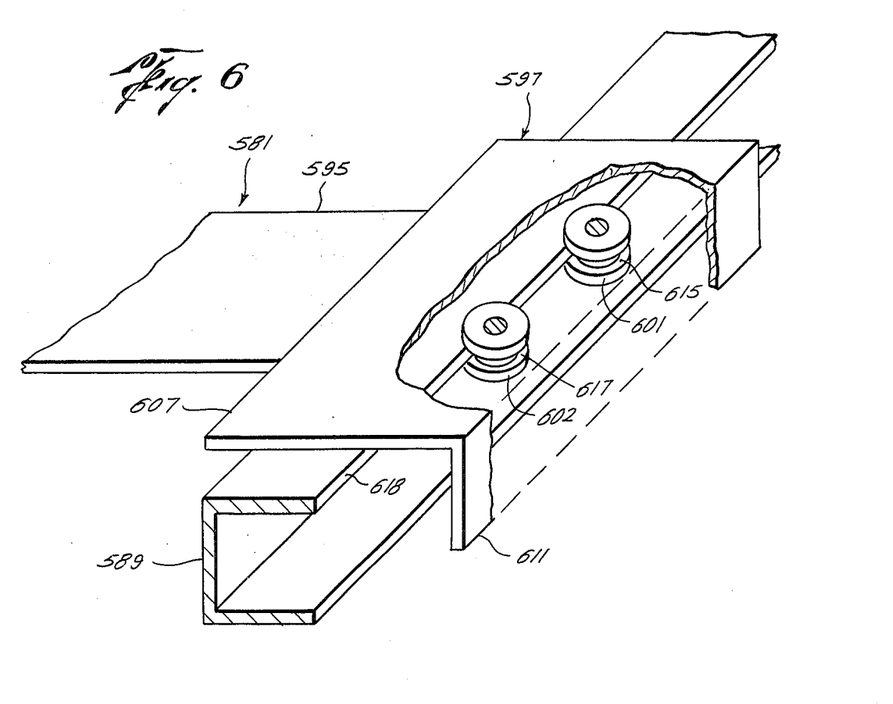
FIG. 6 is an enlarged pictorial view of a portion of the slide bar apparatus of the cutter embodiment of FIG. 4.

Referring to FIG. 6, rollers 601, 602 are rotatably secured to the lower surface of flat upper plate 607 and have grooves 615, 617, respectively, for engaging upper rail 618 of the open side of track beam 589. In a similar fashion, rollers 603, 604 are rotatably secured to the lower surface of flat upper plate 609 and have grooves for engaging the upper rail of the open side of track beam 590.

Figure 7:
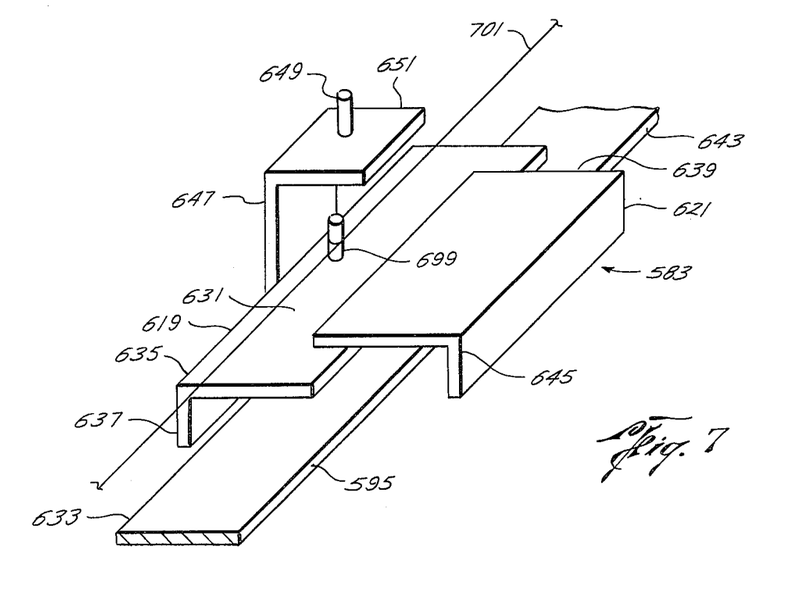
FIG. 7 is an enlarged pictorial view of a portion of the slide unit of the cutter embodiment of FIG. 4.

Slide unit 583 is slidably mounted on center bar 595 of slide bar apparatus 581 such that it can move along center bar 595 in the y-direction. Referring to FIG. 7, slide unit 583 is shown as including first guide unit 619, second guide unit 621, rollers 623–626, and arm connection apparatus 629. First guide unit 619 includes (i) right rectangular flat upper plate 631 extending parallel to and spaced slightly above center bar 595, plate 631 having a length of 4.0 inches, a width of 2.0 inches and having edge 635 extending ¼ inches beyond edge 633 of center bar 595, and (ii) side surface 637 extending vertically downwardly from edge 635 of plate 631 and parallel to edge 633 of center bar 595. Second guide unit includes (i) right rectangular flat upper plate 639 extending parallel to, spaced slightly above center bar 595, and rigidly secured to plate 631 such that edge 641 of plate 639 extends ¼ inches beyond edge 643 of center bar 595 and (ii) side surface 645 extending vertically downwardly from edge 641 of plate 639 and parallel to edge 643 of center bar 595. Rollers 623, 624 are rotatably secured to the lower surface of plate 631 and have grooves for engaging edge 633 of center bar 595. Rollers 625, 626 are rotatably secured to the lower surface of plate 639 and have grooves for engaging edge 643 of center bar 595. Arm connection apparatus 629 provides means by which support arm is rotatably secured to slide unit 583 proximate hot-wire 547 and includes arm connection bracket 647 and arm connection post 649. Bracket 647 is rigidly secured to the upper surface of plate 631 of first guide unit 619 and has flat flange 651 extending parallel to plate 631 and spaced above plate 631 1½ inch. Post 649 rotatably connects the lower surface of the end of arm beam 564 to which support tip 555 is attached to flange 651.

X-movement assembly 585 moves slide bar apparatus back and forth in the x-direction along track beams 589, 590 in response to electrical signals and includes stepper motor 653 and pulley system 655.

Stepper motor 653 has electrical signal input 657, which constitutes a portion of cutter input 23 of the second cutter embodiment, and output shaft 659 which rotates in response to the electrical signal received at input 657, shaft 659 rotating a fixed amount each time an electrical pulse is received at input 657, the direction of rotation depending on the polarity of the pulse. Such stepper motors are readily available, one such motor being manufactured and sold by Superior Electric Co. as model No. MP70. Motor 653 is secured to end A of frame support 513 such that shaft 659 extends vertically upwardly at least ⅜ inch above the upper surface of track beam 589.

Pulley system 655 includes (i) gear 661 securely mounted on shaft 659 of motor 653, (ii) pulley/gear combination 663 rotatably mounted on the upper surface of frame support such that the gear portion engages gear 653 and the pulley portion is disposed above the gear portion, (iii) pulley 665 rotatably mounted on the end of track beam 589 connected to track beam 592, (iv) pulley 667 rotatably mounted on the end of track beam 589 connected to track beam 591, (v) pulley 669 rotatably mounted on the end of track beam 590 connected to track beam 592, (vi) pulley 671 rotatably mounted on the end of track beam 590 connected to track beam, (vii) pulley 673 rotatably mounted on track beam 591 adjacent pulley 671, (viii) posts 675, 677 mounted on the upper surface of plate 607 of end guide 595, (ix) post 679 mounted on the upper surface of plate 609 of end guide 599, (x) drive cord 681 connected at one end to post 677, threaded around pulleys 667, 673, 679, and connected at the other end to post 679, and (xi) drive cord 683 connected at one end to post 675, threaded around pulley 665, the pulley portion of pulley/gear combination 663, pulley 671 and connected at the other end to post 679.

Y-movement assembly 587 moves slide unit 583 back and forth in the y-direction along center bar 595 in response to electrical signals and includes stepper motor 685 and pulley system 687.

Stepper motor 685 has the same characteristics as stepper motor 653 and includes input 689, which constitutes a portion of cutter input 23 of the second cutter embodiment, and output shaft 691, which rotates a fixed amount in response to electrical pulses received at input 689, the direction of rotation depending on the polarity of the pulse. Motor 685 may be a model MP70 stepper motor. Motor 685 is secured to side surface 613 of end guide 599 such that shaft 691 extends vertically upwardly at least ⅜ inch above the upper surface of plate 609.

Pulley system 687 includes (i) gear 693 securely mounted on shaft 691 of motor 685, (ii) pulley/gear combination 695 rotatably mounted on the upper surface of plate 609 of end guide 599 such that the pulley portion is above the gear portion and the gear portion engages gear 693, (iii) pulley 697 rotatably mounted on the upper surface of plate 607 of end guide 597, (iv) post 699 (See FIG. 6) mounted on the upper surface of plate 631 of slide unit 583 directly beneath post 649, and (v) drive cord 701 connected at one end to post 699, threaded around pulley 697 and the pulley portion of pulley gear combination 695 and connected at the other end to post 699.

In accordance with the foregoing description of positioning apparatus 505, it should be apparent that slide unit 583 can be moved to substantially any point within the rectangle defined by track assembly 579, movement of slide unit in the x-direction being in accordance with electrical signals received at input 657 of stepper motor 653 and movement in the y-direction being in accordance with electrical signals received at input 689 of stepper motor 685. Because slide unit 583 is connected to support arm by means of post 649, hot-wire 547 will essentially follow the movement of slide unit 583.

Therefore, by securing a workpiece in clamp 523 such that the lowermost portion of the workpiece is above the uppermost surface of arm beam 564 and the uppermost portion of the workpiece is below the lowermost surface of arm beam 563, and by adjusting the temperature of hot-wire 547 by means of rheostat 571 so that it will easily cut through the material of the workpiece, hot-wire 547 will cut a path through the workpiece in accordance with the signals received at the inputs of the stepper motors. The resultant form will have vertical side surfaces, a cross-section determined by the path followed by the hot-wire in accordance with the electrical signals received at the inputs of the stepper motors and top and bottom surfaces determined by the shape of the original workpiece.

Although the apparatus described in detail supra has been found to be most satisfactory and preferred, many variations in structure are possible without departing from the spirit of the invention. Because many varying embodiments fall within the scope of the inventive concept herein disclosed and many modifications may be made to the preferred embodiment herein described in detail in accordance with the descriptive requirements without departing from the invention, the details herein set forth are to be interpreted and understood as illustrative and not in a limiting sense.

I claim as my invention:

1. A system for converting design information into models by sculpturing a workpiece having a low modulus of elasticity, comprising:

a graphic digitizer in electrical communication and cooperating with a microprocessor, having a processor output, for substantially immediate digitizing of a two-dimensional design drawn on a surface of said digitizer, storing said digitized designs for later recall, and transmitting said digitized designs via said processor output upon command from an external source;

controller means, having a controller input connected to said processor output, and a controller output for converting digital information received at said controller input into electrical signals, said electrical signals being provided at said controller output and having characteristics which are a function of the information received at said controller input; and cutter means, having a cutter input connected to said controller output, for sculpturing said workpiece into a three-dimensional form in accordance with the electrical signals provided at said cutter input, said cutter means including a hot-wire for cutting through said workpiece, whereby two-dimensional designs are immediately reproduced in model form for examination and further refinement and for mass reproduction of an acceptable design.

2. A system according to claim 1 wherein said cutter means comprises:
   a support base;
   a workpiece holder affixed to said base for supporting said workpiece in spaced relation to said base;
   a resistance heated hot-wire for cutting said workpiece;
   a positioning apparatus for two-dimensional positioning of said workpiece relative to said hot-wire in response to said electrical signals from said controller means; and
   a power source for heating said hot-wire and for energizing said positioning apparatus.

3. A system according to claim 2 wherein said work piece holder comprises a platform vertically spaced from and in a plane substantially parallel to said base, said platform defined by a pair of generally co-planar, horizontally spaced beams fixably supported from said base.

4. A system according to claim 3 wherein said positioning apparatus comprises:
   an x-position system for moving said workpiece along said platform;
   a y-position system for moving said hot-wire relative to said platform; and
   a motor apparatus for generating mechanical movement of said x-position system and said y-position system.

5. A system according to claim 4 wherein said motor apparatus comprises a two-dimensional graphic plotter fixed to said base, and comprising:
   an x-signal input for receiving a first electrical signal from said controller means;
   an x-motor for providing mechanical movement in response to said first signal;
   a y-signal input for receiving a second electrical signal from said controller means; and
   a y-motor for providing mechanical movement in response to said second signal.

6. A system according to claim 5 wherein said x-position system comprises a pair of horizontally spaced conveyor belts arranged, by means of a plurality of sprocket systems affixed to said workpiece holder and said motor apparatus, such that a portion of said pair of belts is positioned between and generally co-planar with said horizontally spaced beams to defining said platform, said pair of conveyor belts rotating in conformity with rotation of a paper transport shaft of said plotter comprising said motor apparatus.

7. A system according to claim 6 wherein said y-position system comprises:
   a hot-wire carriage for supporting said hot-wire in a vertical orientation generally normal to said platform with a lower end of said hot-wire extending below said platform;
   a support frame, affixed to said base, for slidably supporting said hot-wire carriage along a centerline of said platform perpendicular to the orientation of said horizontal beams to defining said platform; and
   a carriage drive bar connected at one end to said hot-wire carriage and at an opposite end to a pen transport mechanism of said plotter comprising said motor apparatus.

8. A system according to claim 7 wherein said controller means comprises an electronic interface specifically designed to accommodate electrical communication between said plotter of said motor apparatus and said microprocessor of said storing and processing means.

9. A system according to claim 2 wherein said base comprises:
   a rigid piece of material having a substantially flat, horizontal upper surface; and
   a pair of parallel frame supports affixed along opposing sides of said rigid material.

10. A system according to claim 9 wherein said workpiece holder comprises:
    a pair of parallel side supports vertically spaced from, aligned with, and affixed to said pair of frame supports;
    a cross support aligned perpendicular to and affixed between one end of said pair of side supports; and
    a clamp apparatus centered on said cross support.

11. A system according to claim 10 wherein said hot-wire comprises:
    a hot-wire; and
    a hot-wire support device movably supporting and preventing entanglement of electrical connections to said hot-wire.

12. A system according to claim 11 wherein said positioning apparatus comprises:
    a track assembly comprising a pair of parallel track beams, each of said beams being affixed along an upper surface of one of said frame supports of said base;
    a slide bar apparatus slidably mounted between and perpendicular to said track beams;
    a slide unit slidably mounted on said slide bar and having affixed thereto an end of said hot-wire device with said hot-wire, supported by said hot-wire device, extending vertically from said slide unit;
    means for moving said slide bar apparatus along said track assembly in response to said electrical signals from said controller means; and
    means for moving said slide unit along said slide bar in response to said electrical signals from said controller means.

13. A system according to claim 12 wherein said controller means comprises:
    a first stepper motor coupled to said slide bar moving means to cause positive and negative changes in the position of said slide bar apparatus;
    a second stepper motor coupled to said slide unit moving means to cause positive and negative changes in the position of said slide unit; and
    a stepper driver circuit for amplifying signals from said storing and processing means to energize said first and second stepper motors.

* * * * *